United States Patent [19]

Bond

[11] Patent Number: 4,676,113
[45] Date of Patent: Jun. 30, 1987

[54] MOTION TRANSMITTING MEANS

[76] Inventor: Irvin D. Bond, 10270 Allen Rd., Clarkston, Mich. 48016

[21] Appl. No.: 714,844

[22] Filed: Mar. 22, 1985

[51] Int. Cl.[4] ............................................. F16H 21/44
[52] U.S. Cl. .......................................... 74/102; 74/96
[58] Field of Search ................... 74/96, 104, 105, 107, 74/102

[56] References Cited

U.S. PATENT DOCUMENTS

| 818,783 | 4/1906 | Philippi | 74/104 |
|---|---|---|---|
| 2,775,800 | 1/1957 | Ellms | 74/96 |
| 2,811,871 | 11/1957 | Gaubatz | 74/96 |
| 3,488,955 | 1/1970 | Buelow | 74/96 |
| 4,096,604 | 6/1978 | Eckhardt | 74/96 |
| 4,542,913 | 9/1985 | Giesmann | 74/104 |

FOREIGN PATENT DOCUMENTS

| 88426 | 4/1922 | Fed. Rep. of Germany | 74/96 |
|---|---|---|---|
| 1023268 | 1/1958 | Fed. Rep. of Germany | 74/96 |

Primary Examiner—Lawrence J. Staab
Attorney, Agent, or Firm—Charles W. Chandler

[57] ABSTRACT

A motion transmitting apparatus converts the uniform rate of motion of a piston and cylinder actuator to a programmed motion having a controlled acceleration, a dwell and a controlled deceleration.

3 Claims, 3 Drawing Figures

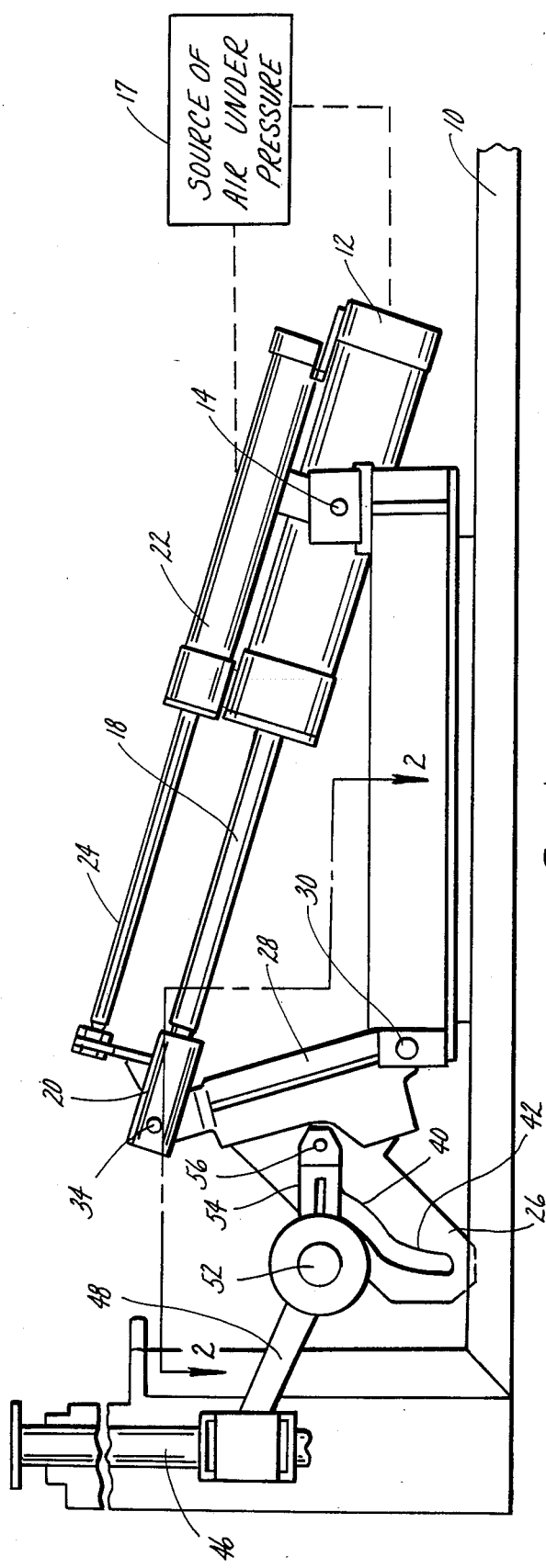
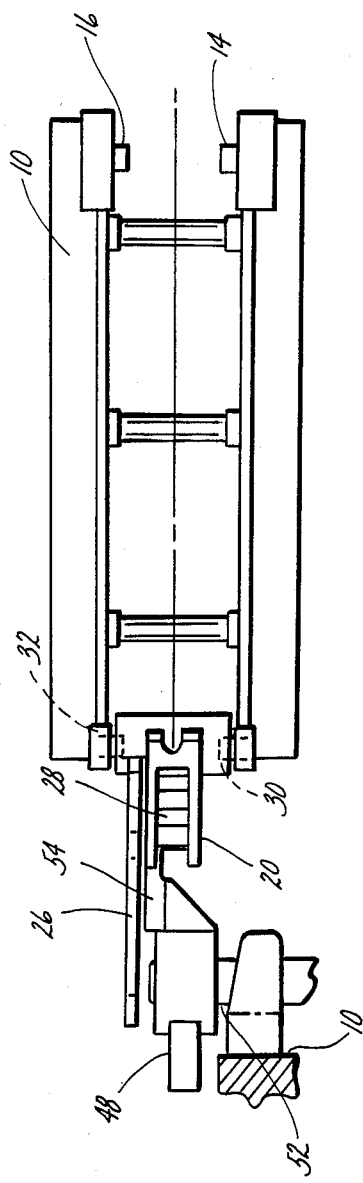

4,676,113

MOTION TRANSMITTING MEANS

BACKGROUND OF THE INVENTION

This invention is related to piston and cylinder actuators, and more particularly to an actuator connected by a cam linkage to a driven member to move it in a controlled motion, including a dwell period. This is particularly useful where the driven member forms part of a lifting apparatus requiring a cushioned stroke for engaging a thin, sheet metal stamping without distorting the stamping.

SUMMARY OF THE INVENTION

The broad purpose of the present invention is to provide a piston and cylinder actuator having a cam plate with a cam slot with a predetermined curvature for connecting a piston and cylinder actuator to a driven member so as to provide the driven member with a dwell as the piston rod is either extended or retracted.

The cam plate has a slot that cooperates with a roller to define a programmed motion transmitting means between the piston rod and the driven member.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is an elevational view of a motion transmitting apparatus illustrating the preferred embodiment of the invention;

FIG. 2 is a view as seen along lines 2—2 of FIG. 1; and

DESCRIPTION OF THE PREFERRED EMBODIMENT

Figure 3:
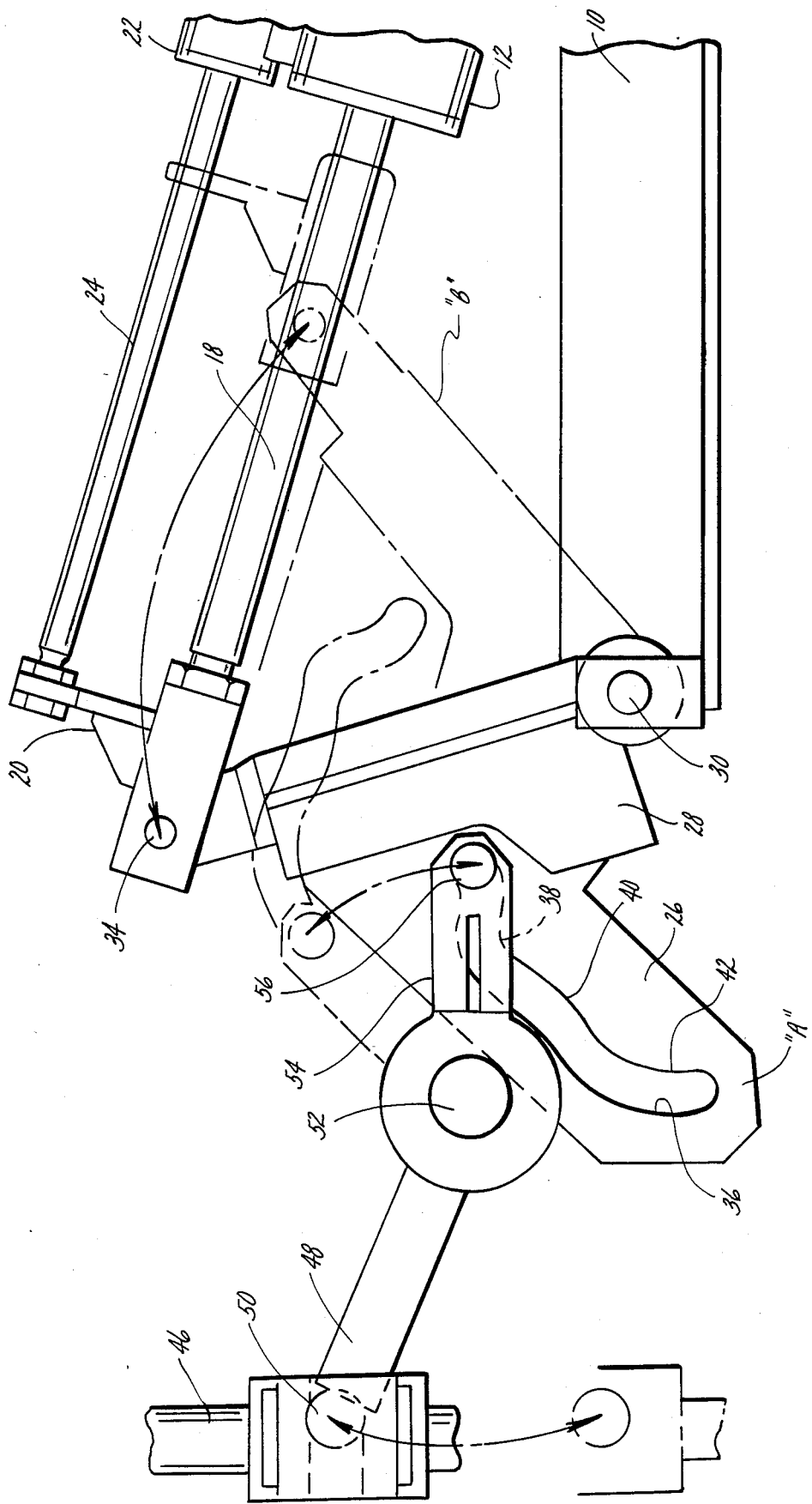
FIG. 3 is an enlarged view of the cam plate illustrating an alternate position in phantom.

Referring to the drawings, a preferred motion transmitting means comprises a base 10. A pneumatic piston and cylinder actuator 12 is mounted by pivot means 14 and 16 on the base. A source of pressurized air 17 is connected to cylinder 12 for either extending or retracting piston rod 18 with respect to the cylinder. FIG. 1 illustrates piston rod 18 in its extended position.

Bracket 20 is carried at the outer end of the piston rod. Hydraulic cylinder 22 is mounted in tandem with cylinder 12 and has piston rod 24 connected to the outer end of piston rod 18 so that the two pistons move in unison. The hydraulic piston functions to prevent surges in the motion of the pneumatic cylinder, in the manner of a shock absorber.

Cam plate 26 is attached to bracket 28. The bracket and pivot means 30 is supported on 32 so that the cam plate is pivotal with respect to the base. Pin means 34 connect piston rod 18 to the cam plate in a position spaced from pivot means 30 and 32. The cam plate is thus movable from a position illustrated at "A" in FIG. 3, in which piston rod 18 is fully extended, toward an alternate position, illustrated in phantom at "B", in which the piston rod is retracted.

The cam plate has slot 36 having three sections, respectively, lower end 38, mid-section 40, and upper end 42.

Referring to FIG. 3, lifting member 46 is mounted on the base for a vertical motion and may be used, for example, for moving a stamping between a pair of work stations.

Arm 48 is connected by pivot means 50 to the lifting member so that as arm 48 is pivoted, the lifting member is moved between upper and lower positions. Shaft 52, mounted on base 10 carries arm 48 and a second arm 54. Cam roller 56, carried by arm 54, is engaged in slot 36 so that both arms 48 and 54 pivot about shaft 52 as the cam plate is being pivoted.

The arrangement is such that as the cam plate is moved from position "A" toward position "B", roller 56 moves from upper end 38 of the cam slot toward lower end 42. As the roller is moved from one end of the cam slot toward the other, arm 48 pivots to either raise or lower the lifting member.

The relationship between the rate of motion of the lifting member and piston rod 18 depends upon the curvature of cam slot 36. Ends 38 and 42 are formed to provide a controlled acceleration and a controlled deceleration as the lifting member is raised. Referring to FIG. 3, lower end 42 of the cam slot is curved somewhat around pivot means 30, while a portion of upper end 38 is also curved around pivot means 30. Midsection 40 is curved in the opposite direction.

This provides a dwell, that is to say, as the piston rod is extended at a uniform rate of motion, the roller tends to hesitate as it moves from one end of the cam slot toward the other. The cam plate thereby provides a cushioned motion to the lifting member which can be used for a variety of applications. The acceleration and deceleration of the lifting member is defined by the curvature of the ends of the cam slot. Thus the entire motion of the lifting member is programmed to accommodate the nature of the work being accomplished. The motion of the lifting member can be changed by changing the cam plate to one having a different curvature.

Having described my invention, I claim:

1. Motion transmitting means comprising:

a base;

a cam member;

first means pivotally connecting the cam member to the base for a rocking motion about a first axis;

a power cylinder actuator means having a piston rod movable in a continuous motion in either a first direction or in the opposite, second direction;

second means pivotally connecting the power cylinder actuator to the base for pivotal motion thereto, third means pivotally connecting the piston rod to the cam member to rock same in a first direction as the piston rod is being moved in said first direction, and to rock the cam member in the opposite direction as the piston rod is being moved in the second direction;

a driver arm;

fourth means pivotally supporting the driver arm on the base for rotation about a second axis, parallel to the first axis; and a cam roller carried on the driver arm so as to be spaced with respect to the second axis, the cam member having a cam opening receiving the cam roller, the cam opening being elongated such that as the cam member is being rocked about said first axis in a continuous powered motion in said first direction by the power cylinder actuator means, the driver arm is pivoted about the second axis in a stroke having a predetermined dwell in mid-stroke.

2. A combination as defined in claim 1, including a lifting member connected to the fourth means so as to be operable to raise a workpiece in a stroke having a dwell in mid-stroke as the piston rod is being moved by the power cylinder actuator means in a generally continuous uniform motion.

3. A combination as defined in claim 1, in which the cam opening has an elongated midsection, and the dwell corresponds to the length of the midsection.

* * * * *